Nov. 23, 1943.   H. D. MINICH   2,335,190
STRETCHED LAMINATED PRODUCTS AND PROCESS FOR MAKING THEM
Filed July 29, 1942   2 Sheets-Sheet 1
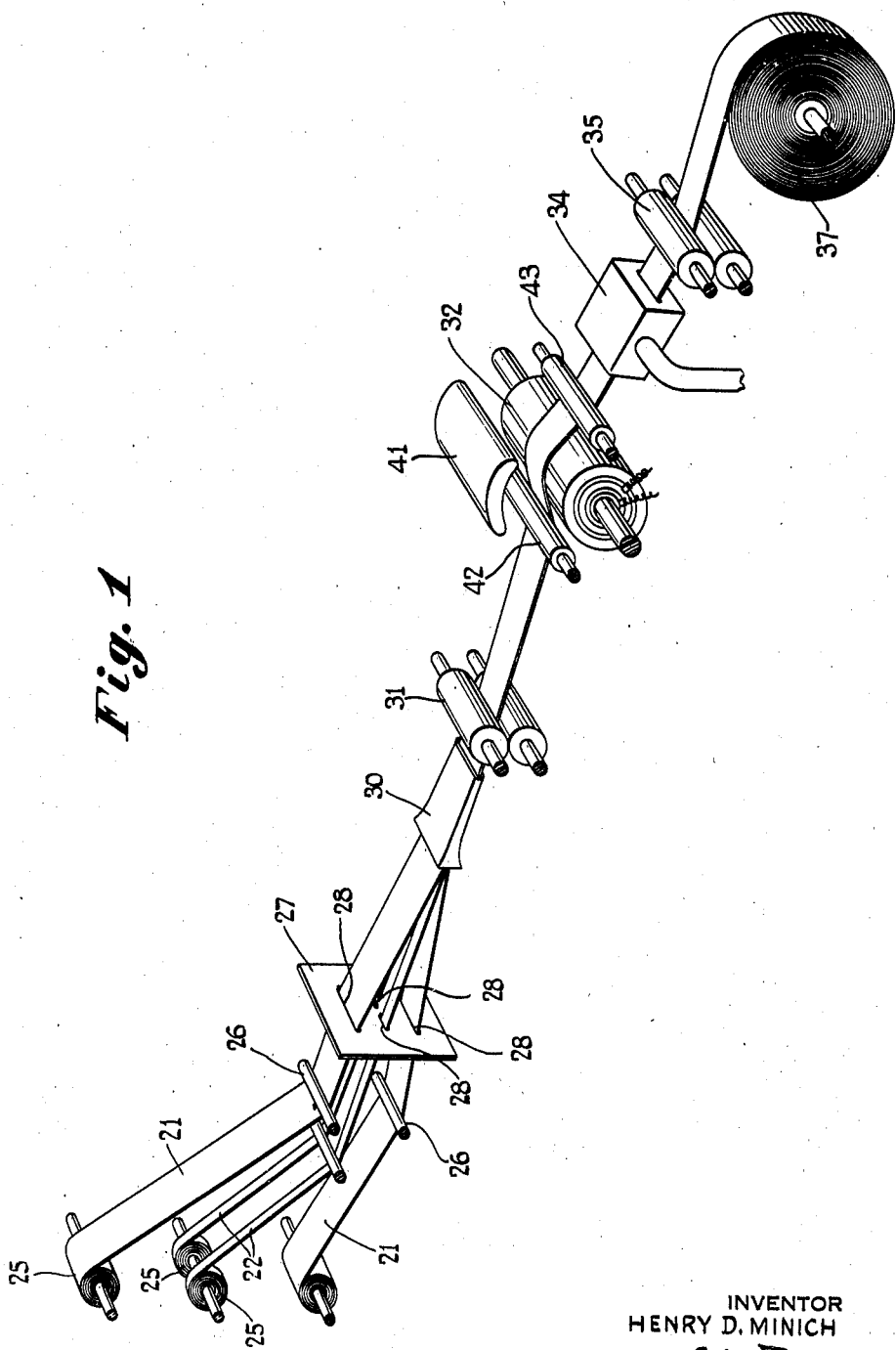
INVENTOR
HENRY D. MINICH
BY S M Pineles
ATTORNEY

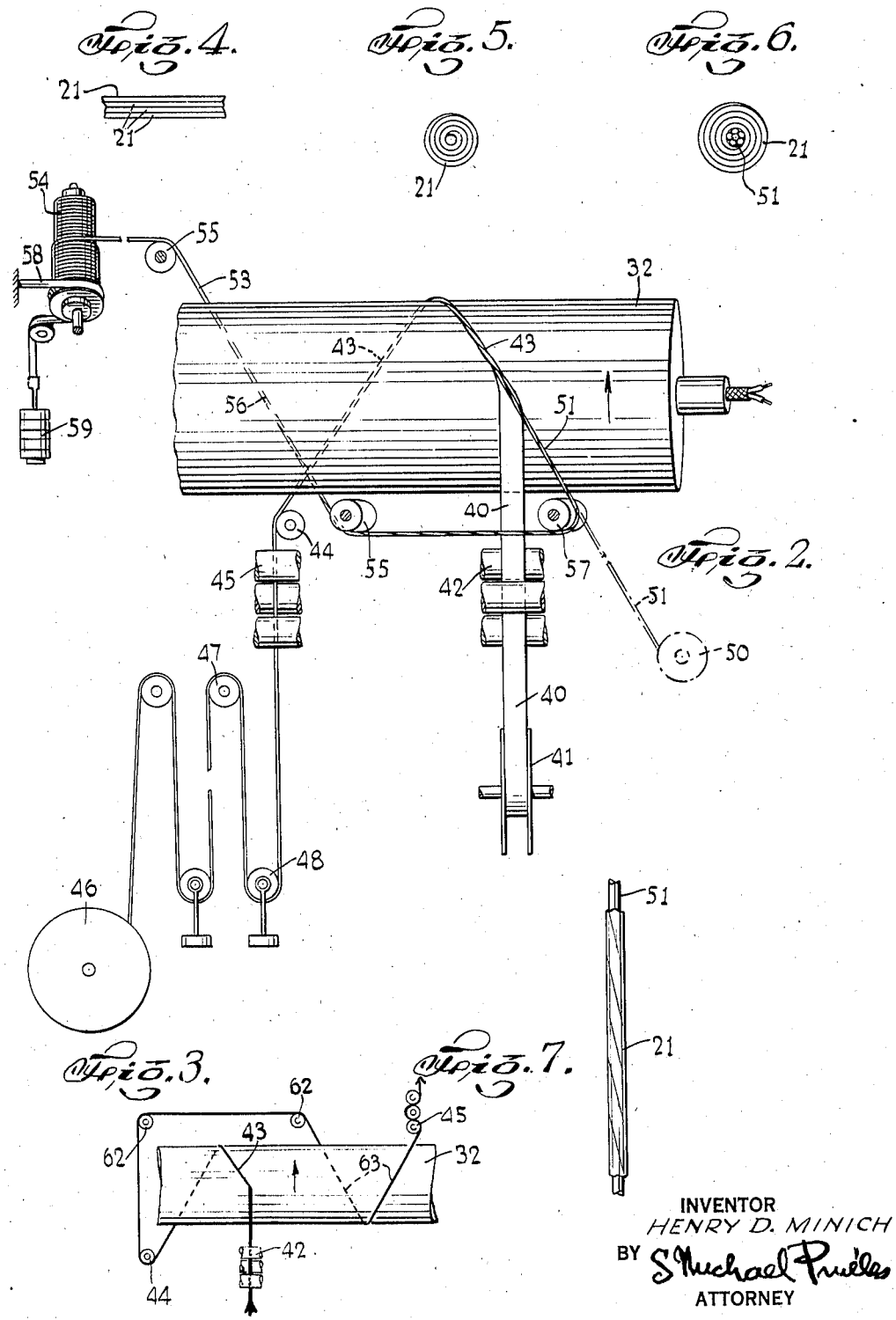

Patented Nov. 23, 1943

2,335,190

UNITED STATES PATENT OFFICE 2,335,190

STRETCHED LAMINATED PRODUCT AND PROCESS FOR MAKING IT

Henry D. Minich, North Tarrytown, N. Y.

Application July 29, 1942, Serial No. 452,780

20 Claims. (Cl. 18—57)

This application is a continuation-in-part of my applications, Serial No. 77,123, filed April 30, 1936; Serial No. 251,465, filed January 18, 1939; Serial No. 314,857, filed January 20, 1940; Serial No. 350,624, filed August 3, 1940; Serial No. 350,-625, filed August 3, 1940; and Serial No. 350,627, filed August 3, 1940.

This invention relates to stretched laminated products and processes for making them from film material having properties of the type exhibited by commercially available rubber hydrochloride film material.

For several years prior to the present invention, there has been on the market a thin film of rubber hydrochloride material, which, because of its many desirable characteristics, was receiving a good acceptance by the trade for use as a moisture-proof wrapping material, raincoats and the like.

While experimenting with such commercially available thin single film rubber hydrochloride material in an effort to utilize it for purposes utterly unrelated to the present invention, I accidentally discovered that when such film material is heated to a temperature at which it becomes coalescent, it also acquires elastic properties of the type exhibited by natural rubber, and that a heated film of such material, when released from a stretched condition, will at once contract to its original unstretched condition just as is the case with natural rubber at normal temperatures. In conjunction therewith, I also accidentally discovered that a laminated film product of unusually desirable characteristics can be made from such single film material, by heating a plurality of superposed film formations of such single film material until they become coalescent and elastic, then stretching and uniting the coalescent and elastic film formations while hot into a laminated structure, and then—while maintaining it in the stretched condition—cooling the laminated structure to the normal lower temperature at which it retains its stretched united laminated structure. The so obtained laminated film structure, even though thinner than the individual original single films out of which it is made, has much greater tensile, and shock impact strength, and much greater flexibility and clarity than the original film material, in addition to having many other desirable characteristics not present in the original film material.

Since the subject matter of the present invention was discovered while experimenting with thin rubber hydrochloride film, which was commercially available at the time of the invention, I will describe herein specific exemplifications of the invention as practiced with such thin rubber hydrochloride film material, reference being had to the accompanying drawings, wherein Fig. 1 illustrates diagrammatically an apparatus assembly for making some of the laminated products of the invention;

Fig. 2 is a diagrammatic front view of another apparatus assembly used for making elongated laminated products, such as threads or covered wires, in accordance with the principles of the invention;

Fig. 3 is a diagrammatic view similar to Fig. 2 of an arrangement for making elongated laminated products of the invention;

Fig. 4 is a greatly enlarged cross-sectional view of a portion of a laminated film product of the invention;

Fig. 5 is a cross-sectional view similar to Fig. 4 of a laminated thread product of the invention;

Fig. 6 is a cross-sectional view similar to Fig. 4 showing a covered product of the invention in the form of a core, such as a wire core, covered by a laminated covering; and Fig. 7 is an elevational view of a covered multistrand wire cord enclosed in a laminated covering of the invention and having a cross section of the type shown in Fig. 6.

The commercially available transparent, colored or opaque rubber hydrochloride film is being made by the process described in Calvert Patent 1,989,632, assigned to Wingfoot Corporation, and has been used for wrapping, raincoats, etc. It is usually about .001 inch in thickness, and it is made by spreading a solution of rubber hydrochloride, in a solvent, such as chloroform, on a moving belt, the solvent being evaporated, and the thin film so formed being stripped off the moving belt. It is very difficult and costly to make thicker films, because if the required thicker layer of the solution is cast, the evaporation of the solvent forms on the exterior of such layer a skin-like film which retards the evaporation of the solvent from the lower part of the layer. The use of such cast thin films is not only very limited, but it has also less tensile strength than similar cellulosic film.

I have found that a laminated film product of the same small thickness of about .001 inch, but of much greater tensile strength, as well as much thicker laminated film products of such much greater tensile strength, may be made from a plurality of superposed film formations of material, which is solid at normal temperature and has characteristics of the type exhibited by rubber hydrochloride, by heating the superposed film formations to an elevated temperature at which their structure becomes coalescent and elastic, then stretching and coalescing the superposed film formations under pressure while hot, and then cooling the resulting laminated film structure while maintaining it in stretched condition to normal temperature at which it retains its stretched coalesced structure.

In order to make an improved laminated film product of the invention, a plurality of superimposed films, of such cast untreated rubber hydrochloride material, are fed over a heating surface—which heats them to a temperature at which they stretch and coalesce, and from which the superposed films are withdrawn, at a speed of about 2 to 6 times the speed at which they are being fed, so as to cause the superposed films to fuse and coalesce and stretch while heated, and then solidifying the so coalesced stretched and laminated film structure, by cooling, while it is maintained in the stretched condition. A revolvably mounted heating cylinder is advantageously used as a heating surface. A set of driven revolvably mounted feeding rollers feed the superposed films to the heating cylinder. A set of driven revolvably mounted stretching rollers withdraw the film from the heating cylinder.

By controlling the approach of the film to the heating surface and by varying the character of the heating surface, the appearance and the texture of the final stretched laminated product may be controlled within wide limits. In carrying on the stretching and laminating process, the superposed films are heated to an elevated temperature in the range between about 150° F. to 230° F., and preferably above about 200° F. at which the material becomes coalescent and highly elastic.

A laminated film product so made and having the same small thickness of .001 inch as the cast film has about fifty times greater tensile strength, and resists a shock impact to a much higher degree, than a single film of the same thickness out of which the laminated product is made.

By varying the heat and adjusting the feed of the sheets just prior to their contact with the heating surface, various longitudinal graining effects are produced in the stretched sheet material. By slightly overlapping the edges of the sheets just prior to the fusing of the material "beaded" edges are formed in the sheet material for improving its appearance and adding to its strength.

By introducing colored film layers, either above or below or between other film layers, sheet material of an infinite variety of color ranges and effects is produced. By introducing the colored layers between the transparent layers, colored material that ordinarily would "run" is protected by the outer transparent layers of the stretched product against the effects of moisture or other damage. In addition, the new treatment adds lustre that does not exist in the original material.

By interleaving strips of the coloured rubber hydrochloride film material as they are applied lengthwise to one or more layers of clear material, for instance, colored strips 22 and transparent sheets 21 shown in the drawings, there are produced a great variety of colors, shades and thicknesses of material ranging from narrow ribbon to wide material suitable for shower curtains, raincoats, table covers, umbrella coverings, packing material, wall covering, dress goods, and the like.

By introducing opaque layers under or between one or more colored or transparent layers, the available colors are intensified and modified. By coalescing more layers of the same color, deeper shades of the same color are obtained.

Fig. 1 of the accompanying drawings illustrates how the process of the invention may be carried out in making the improved ornamental sheet material out of untreated sheet material. To make, for instance, an ornamental sheet having two narrow colored stripes on a transparent background, two wide transparent film strips 21 and two narrow red strips 22 from suitably supported rolls 25 of untreated sheet material are led over guide rolls 26, through an assembly pattern 27, having slits 28 locating the various strips relatively to each other. The properly assembled sheet strips 21 and 22 are then passed through the narrow outlet of a tapered mouth 30 into the gap between the two feed rollers 31 which feed the assembled lamination pattern over the heating surface of a heating cylinder 32 by way of a cooling compartment 34 to the stretching roller 35 which delivers the finished product to the reel 37.

By using a collection of rolls of untreated sheet material of various colors, widths and textures, supported on a rack from which the materials for making up a particular ornamental pattern may be readily selected, and assembling the material by means of a suitable assembly pattern according to the character of the material that is to be produced, products of different patterns may thus be made readily.

The stretching rollers 35 are driven at the required higher speed than the feeding rollers 31 by any suitable driving mechanism. As the assembled laminations of a given pattern passing over the surface of the heating cylinder 32 are heated to a plastic state, the higher speed of the stretching roller stretches the plastic laminations and causes them to fuse into a homogeneous sheet, the thickness of which is only a fraction of the thickness of the untreated sheets which approach from the feeding roller. The heating action exercised by the heating cylinder on the sheet material that is moving over its surface may be suitably controlled by varying the supply of heating energy and additional heat may be supplied to the upper layers of the passing sheet material by an auxiliary heater 41 which, like the heating cylinder, may be electrically energized and controlled in accordance with the requirements. The heating cylinder 32 is mounted to roll freely as the heated sheet is drawn over its surface and the heating action applied by the roller to the sheet material passing thereover may be additionally controlled by adjusting the angular area of engagement of the sheet material with the heating cylinder. By providing one or more adjustably mounted rollers adjacent the heating cylinder 32, such as idling rollers 42, 43, the engagement of the sheet material with the heating surface may be readily controlled.

The characteristics of final lamination sheet products obtained by the stretching action may be modified by varying the speed of the individual sheets, for instance, by causing the upper of the two stretching rollers 35 to move at a higher or lower speed than the lower stretching roller. This control may be also exercised by making the speed of one of the two feed rollers 31 greater than the other and by correlating the drive of the heating cylinder with the drive of the feeding rollers or the stretching rollers, or both.

By making the surface of the heating cylinder over which the sheet material passes grained or ribbed, the character of the resulting sheet material may be patterned in various ways to produce grained, ribbed, or a variety of other effects. In a similar way, the surface of one or both idling rollers 42, 43 may be shaped and provided with ornamental or other designs for controlling the texture of new sheet material within wide limits to produce a variety of ornamental designs. The character of the sheet material produced by this process may also be controlled by suitably shaping the slots of the assembly pattern 27 or the outlet of the throat 30. Thus, by making the throat opening somewhat narrower than the widest lamination sheets, the edges of the laminations entering the feeding roller 31 are folded, and beads are formed on the stretched sheet product delivered by the stretching rollers 35.

In a similar way, the slits 28 in the assembly pattern may be made narrower than the sheets which are fed through these slits so that the edges of the passing sheets are folded, causing the assembled lamination to have bead or rib-like formations and producing a final stretched sheet product with bead-like or rib-like formations.

The process described above lends itself to the manufacture of a great variety of sheet material products which may be produced in different color combinations, and with various kinds of ornamentations, the final material having a lustre and a crackly feel and characteristics which make it much superior to the original untreated material.

By the new process, a given quantity of untreated sheet material is converted into a larger quantity of the new stretched sheet material having characteristics which make it much superior to the untreated material.

The new process makes it also possible to produce sheet material having a great variety of colors, shades, thicknesses and widths ranging from narrow ribbons to wide material suitable for a variety of purposes.

By repeating the stretching process described above with material that underwent a previous stretching treatment, or applying a second stretching treatment to a plurality of laminations of previously stretched materials, new sheet materials richer in lustre and of increased crackliness are produced.

Special ornamental effects may be obtained by perforating or imprinting one or more of the intermediate layers of the laminations fed through the feeding rollers 31, so that, on stretching, a final pattern is given to the stretched treated material delivered by the stretching rollers. In making such patterned material, due allowance must be given to the deformation of the pattern incident to the stretching process.

Special ribbed effects may be produced in such laminations by assembling between the sheet laminations narrow strips of the untreated sheet material so that the resulting stretched material produced out of the ribbed lamination has longitudinal ribs which reinforce the material and give it an ornamental effect.

A variety of other shaped bodies may be made by the process of the invention. Thus by using narrow strips of untreated rubber hydrochloride and rolling back and forth the strip as it is moved over a heated surface and stretching it as it moves away from the heated surface, floss, thread, strings, and similar products resembling natural gut may be produced. Such thread material is a good substitute for natural gut and is suitable for surgical sutures, for musical strings, for stringing rackets, for leaders in angling, for fishing lines and nets, and other uses in which its high tensile strength and water-proof or non-inflammable characteristics are desirable. It has the additional advantage that it does not tangle as readily as ordinary thread. Such thread and gut may be produced in various colors and various finishes from a very smooth surface to a rougher surface, depending on the surface over which it is heated and moved while twisted and rolled.

An ornamental cord of special lustre and light effects may be produced by using several ribbons of stretched heat-treated rubber halide material made in accordance with the present invention and twisting it while being subjected to heat in the manner described above. Strong tying material in many color combinations with an unusually high lustre is thus obtained.

Alternatively, special ornamental effects may be obtained by twisting a strip of untreated material with a strip of pretreated material while the two are heated and stretched.

Still other products may be obtained by laminating layers of stretched material with layers of unstretched material. Thus, by coalescing superimposed layers of stretched and unstretched material sheets while they are heated to a plastic state and releasing them from the stretching force in coalesced condition while they are plastic, a crinkly sheet material is obtained. By heating a lamination composed of narrow strips of prestretched material enclosed between two wider strips of unstretched material to a plastic condition and releasing it from the stretching force before it has cooled down, a strip having a crinkled central surface and ruffled edge portions is obtained.

By assembling laminations composed of sheets having crosswise running grains or ornamental patterns and fusing them in a plastic state while heating, a homogeneous lamination is obtained which combines the pattern effects of the component original sheets.

Since the treated rubber material of the invention requires heating to a higher temperature than such untreated material, in order to render it sufficiently coalescent for fusing it to another material, but has much greater tensile strength than untreated sheet material, I combine the properties of the two materials by leaving between laminated portions which have been stretched to increase their tensile strength, small portions which are not stretched and thus can serve for heat-sealing when the material is to be used for making sealed packages. Such material is very desirable as a wrapper for cigarette packages or in similar applications. Such stretched sheet material with intermediate unstretched sealing strips may be obtained by reducing the tension applied to the sheet material at predetermined intervals in the heating stretching operation.

Since various grades of commercially available single film material used in making the stretched laminated products of the invention, differ in some of their characteristics, a simple preliminary experiment should be made to determine at which temperature it acquires the coalescence and elasticity required for making out of it laminated products of the invention.

In making slender elongated laminated products, such as a laminated filament or laminated cord of the invention, an elongated formation of film material, such as a long strip of film, is heated to a temperature at which it becomes coalescent and elastic, and the so heated film formation is then stretched and its lateral portions are compacted and united under pressure, so as to form out of it a laminated stretched thread-like product. For example, the film may be heated and then while hot, it may be stretched and may also be twisted or rolled back and forth with pressure to compact it. The twisting or rolling of the heated film forms it into a filament-like structure.

A narrow strip of rubber hydrochloride film, for example, a strip several inches wide is moved over a heated surface and rolled back and forth as it is moved over the surface and it is pressed to the surface to compact it. It is stretched as it is drawn away from the heated surface. The temperature of the heated surface is so regulated as to cause overlapping surfaces of the rubber hydrochloride to fuse together as it is thus twisted or rolled and compacted. A suitable heated surface is a cylinder 6 to 10 inches in diameter. By bringing one or more strips of film to such a heated cylinder in a substantially flat condition and by rolling it or twisting it on the cylinder and then drawing it away from the cylinder at a speed higher than that at which the film is brought to the cylinder, for example, at a speed several times that at which the film is brought to the cylinder, the film is formed into the stretched filament of this invention. Overlapping surfaces of the heated film are united by fusion. The resulting product is a substantially cylindrical filament. Filaments from .005 inch in diameter to .125 inch in diameter, more or less, may be formed in this way. These filaments may be used for dental floss, thread, strings and similar products. The filaments form a good substitute for natural gut and are suitable for surgical sutures, for musical strings, for stringing rackets, for leaders in angling, for fishing lines and nets and other uses in which their high tensile strength and waterproof and non-inflammable characteristics are desirable. They have the additional advantage that they do not tangle as readily as ordinary thread. Such thread and gut may be produced in various colors and various finishes from a very smooth surface to a rougher surface, depending on the surface over which they are heated and moved while twisted or rolled.

Fig. 2 shows one arrangement for making a filament, thread or cord of the invention. It has a revolvably mounted suitably rotated heating roller 32, as in Fig. 1, which is heated to a surface temperature of about 180° F. to 200° F., more or less. A film strip 40, for instance, about ⅝ inch wide and about .015 inch thick, stored in the form of a roll on spool 41, is fed by a set of suitably driven feed pinch-rollers 42, toward the heating surface of the cylinder, in a substantially flat condition, and the heated film formation is pulled on a bias along a helical path 43 over the heating cylinder 32 and led therefrom over a grooved guide roller 44 located on the other side of the cylinder 32 to a set of revolvably mounted stretch pinch-rollers 45 which are rotated so as to withdraw the film formation 40 from the heating cylinder 32 at a speed several times greater than the speed at which the film strip is being fed by the feed rollers 42.

The rotational speed of the heating cylinder 32, and the location of the feed rollers 42, guide roller 44 and stretch rollers 45 is so adjusted as to cause the rotating heating cylinder 32 not only to heat the film formation 40, but also to roll or twist it upon itself as it is being stretched, while its overlapping portions are being coalesced and compacted into a laminated filamentary product, which is suitably cooled before reaching the stretching rollers 45. The resulting filament or thread product delivered by the stretching rollers is then suitably rolled on reel 46.

The minimum temperature of the roll 32 is such that the film will roll and not slide. This depends somewhat upon the surface of the roll. The speed at which the laminated filament is drawn from the cylinder 32 may be four times, more or less, that at which it is fed to the cylinder. The amount of stretch is dependent upon the difference in the circumferential speed of the cylinder 32 and the stretching rollers 45. The filament, in being drawn from the cylinder may be passed under tension over the freely revolvable grooved roller 44. This tends to compact the filament and cause the outer layer of film to become firmly united with the balance of the filament.

By suitably varying the location of the feed rollers 42 and the deflecting roller 44 to a position closer or farther away from the heating cylinder 32, and by varying their locations with respect to the cylinder, the extent of the helical path 43 along which the combined heating, rolling, stretching and compacting actions take place, may be adjusted within a wide range. The effect of these combined operations is further adjustable by varying the width of the strip 40, the temperature of the cylinder and the other variable factors entering in the process.

To obtain a still more uniform threadlike product, it is of advantage, after having it formed by rolling it in one direction, for instance, as it passes over the helical path 43 of the heating cylinder 33, to subject it to an opposite rolling treatment. Fig. 3 shows one form of arrangement for utilizing the same heating cylinder 32 for performing both rolling motions. The thread, after having been formed along the helical path 43, as in the arrangement of Fig. 2, is led from roller 44, over two similar rollers 62 into engagement with the rotatably mounted cylinder along an opposite pitched helical path portion 63, the doubly rolled laminated thread product being shown withdrawn directly by the stretching rollers 45. The effect of the reversed rolling action along the helix path 63 may be adjusted in a manner analogous to that explained in connection with the helix path 43.

I have also found that the process of the invention as used for making the novel laminated thread-like or cord-like products described above in connection with Figs. 2 and 3 lends itself also for making covered slender elongated objects, such as covered threads or cords having an inner core—for instance, of textile or rubber or glass threads or wire strands.

According to the invention, an elongated core, such as a thread, is enclosed in a laminated covering formed by heating an elongated strip-like film formation of material, such as rubber hydrochloride film to a temperature at which it is coalescent and elastic, and stretching and rolling the so heated film formation in a spirally overlapped relation over the elongated thread core, so as to coalesce, compact and unite under pressure the overlapping film formation into a laminated covering structure while it is maintained heated and stretched around the core, and then cooling the covering with the core enclosed therein to the normal lower temperature at which the core forms a solid flexible enclosure surrounding and protecting the core.

Such covered products of the invention are slender, elongated objects, preferably substantially circular in cross-section. They include filaments of wires of different composition and including single strands of wire and wires made up of a plurality of strands, which may either be twisted or substantially straight, fabric materials including threads of cotton, linen, rayon, etc., whether the individual strands are twisted together or substantially straight, threads of rubber, threads of glass fibers in which the fibers may be twisted or substantially straight, gut, etc.

The covering film is stretched as it is wound spirally over the core. The film is in the form of a narrow ribbon which may be up to an inch in width but is generally narrower, of the order of about a quarter of an inch in width. As the film is wound over the core, it is heated and stretched to at least one half of its original thickness. It is applied hot to the material which it covers, and with sufficient pressure so that the overlapping layers of the covering coalesce to form a unitary sheath for the core and constitute therewith a unitary product.

It is a characteristic of the heated, stretched film that it is elastic and tends to retract. Since in the covered products of the invention the heated laminated film covering is stretched and tightly wrapped over the core while the film is heated and elastic, the laminated covering on cooling shrinks around the core as though the covering were shrunk to it.

In making a covered thread with the arrangement of Fig. 2, a strip 40 of the covering film is first led from the feed pinch-rollers 42 over the rotating heating cylinder 32 toward the stretching punch-rollers 45, thereby starting the operation of making a spirally laminated stretched thread out of the film cover strip 40, exactly in the manner described above. Thereupon, the end of a thread 51 which is to be covered is withdrawn from the storage spool 50 and placed under or looped around the portion of the covering strip 40 near the point where it makes contact with the heated cylinder surface, so as to be caught by and pulled with the rolled strip 40 along its helical cylinder path 43 toward the stretching rollers 45. This starts automatically the covering operation, because the covering strip 40, instead of being merely spirally wound upon itself as it is being pulled on a bias over the heated cylinder surface, in the manner before described, is now spirally wound in overlapped relation over the thread core 51 and over itself, automatically pulling with it the thread core 51 as it is being heated, wound, stretched, coalesced and compacted by the combined pulling action of the stretching rollers 45 and the rolling action of the rotated heated cylinder surface 32.

The cover strip 40 may be about .001 of an inch thick. It may be no more than .008 inch thick and may be as thick as .0015 inch or thicker. It may be colored with dyes or pigments. The nature and composition of the ingredients added to the film will at least in some instances be controlled by the use to which the wrapped article is to be put.

The thickness of the covering as it is applied to the thread, may be no more than about .0002 inch or even less and may be as thick as .0007 inch. Where only a color effect is desired, the wrapping, of course, may be exceedingly thin.

Various articles may be wrapped with a shrunk-on covering of the foregoing type. Glass thread wrapped in this way has been used to replace the gut of a tennis racket, thus forming a tennis racket string which is not affected by the weather. Furthermore, an ordinary gut string has been similarly wrapped with rubber hydrochloride to protect it from moisture. Cotton, rayon and linen threads coated in this manner with rubber hydrochloride film are impervious to water and moisture and are therefore adapted for the use where the usual threads cannot be employed. Wire so coated has been found satisfactory for conducting electrical currents of low amperage, the rubber hydrochloride coating serving as an insulating material. Unplasticized rubber hydrochloride is ordinarily more satisfactory for electrical insulation than plasticized material. The wire may be composed of a single filament or many fine threads which may be either twisted or untwisted. Any slender, elongated object of substantially cylindrical cross-section may be wrapped with rubber hydrochloride, as shown, to make it waterproof and moisture-vapor-proof.

Rubber or a similar elastic thread may likewise be covered by a laminated covering in the manner described above in connection with Fig. 2. A thin covered elastic thread having stretching properties similar to the commercially used Lastex yarn, may thus be made. In order to make such elastic covering, it should be stretched before the laminated film covering is applied thereto. Furthermore, it is important that the elastic covered thread should be balanced and should not acquire any axial twist while the covering is being rolled thereover.

Fig. 2 shows one arrangement for making a thin elastic covered thread of balanced tension, having properties similar to Lastex yarn. From a revolvably mounted spool 54, a thin elastic thread 53 is guided by two suitably located revolvably mounted grooved rollers 55 under a bias over a helical path 56 along the rotated surface of the heating cylinder so as to give it a pretwist opposite to the pretwist it receives after it is led over the additional similar roller 57 to the position where it comes into contact with the covering strip 40 and is further drawn with it and covered thereby as it is being twisted in opposite direction along the helix portion 43, in a manner analogous to the thread covering operation described above.

The amount of pretwist to which the rubber thread is subjected along the helix path 56 may be varied by adjusting the location of the two rollers 55 which guide it over the rotating cylinder 32.

In addition, the rubber thread 53 must be maintained in the desired stretched condition while it is being led over the roller 57 toward the helical cylinder path 43 along which it is being covered. This preliminary stretch of the rubber thread 53 may be supplied by providing its spool 54 with a conventional drag brake, formed, for instance, of a brake pulley which is engaged by a brake band 58 held under a tension determined by adjustable weights 59 suspended thereon.

In making such elastic thread, it is important that the laminated film covering is thin enough so as to permit the stretched covered elastic thread to contract after leaving the feed rollers. If the covering is made of too many superimposed overlapping spirally wound film formations, the covering may, after cooling, resist contraction of the final product by the elastic characteristics of the rubber core to an extent that will greatly reduce the utility of the finally covered thread in serving as an elastic yarn.

If a very fine covering is applied to a stretched elastic rubber thread, in the manner explained above, for instance, by using a cover strip 40, $\frac{1}{16}$ of an inch wide, a good thin elastic yarn thread product will result if the rubber thread is covered while it is maintained in the stretched condition in the manner explained above. If such thread is provided with a too heavy covering, it will, after cooling, hold the rubber core in an expanded position.

In order to give elastic thread made with such covering additional elasticity, the covered thread, after passing out from the stretching rollers 45, may be passed through a bath, for instance, a water bath maintained at a temperature in the range between about 180° to 200° or 210°, so as to permit it to relax and contract to any desired greater extent than that with which it is coming from the stretching rollers.

Laminated film products of the present invention—made by the combined heating, coalescing and stretching operations followed by cooling while held stretched—if wound too soon on a pulp-board core, will cause the core to collapse because of a tendency to shrink, remaining in the final cooled laminated film product delivered by the stretching rollers 45.

According to this invention, after heating, coalescing and stretching, followed by cooling, the laminated film product is allowed to shrink before it is wound. The amount which the laminated product will shrink or retract is dependent upon its composition, the temperature to which it is cooled under tension, etc.

Rubber hydrochloride film has been found to be one of a limited class of materials which when heated above the normal temperature become not only coalescent, but also become elastic, and contract at once when released from the stretching tension, much like natural rubber at normal temperatures, and such materials may be generally designated as being "thermo-elastic" in differentiation from "thermo-plastic" materials which have little or no tendency to contract upon release of the stretching tension.

By heating, the internal viscosity of such thermoplastic films is reduced. The internal viscosity of the thermo-elastic laminated film products of this invention is reduced on heating so that the film products can be readily stretched. The stretch becomes permanent at the temperature at which the stretching tension is released, except for a certain contraction or retraction which does not occur immediately, and whose extent depends upon the degree of stretching, the temperature of stretching, and the temperature at which the tension on the laminated film product is released. According to the invention, the winding of the stretched laminated film product is delayed until such retraction has taken place.

This may be done in the way indicated in Fig. 2 by leading the laminated film product, delivered by the stretching rollers 45, in the form of a series of festoons over festoon rollers 47 and floating rollers 48, and rolling it on the reel 46 only after it has substantially fully contracted and does not retain a tendency to shrink.

In the foregoing I have described the outgrowth of my accidental discovery of the thermo-elastic characteristics of rubber hydrochloride film material, and how various new improved laminated products may be made from such thermo-elastic film material which becomes elastic, like rubber, when heated to a temperature at which it becomes coalescent and tends to fuse. A further examination of the characteristics of such material established that unlike natural rubber, which has an amorphous structure at normal temperatures, rubber hydrochloride has a crystalline structure at normal temperatures, as established by X-ray diffraction patterns. When such rubber hydrochloride is heated to temperatures in the range between about 180° to 230° F. at which it becomes coalescent and elastic, it retains its elastic structure, its X-ray crystalline pattern passing, however, into an amorphous pattern when it is heated above 230° F.

When such rubber hydrochloride film is heated to a temperature of coalescence at which it becomes elastic, up to about 230° F., and it is stretched while so heated, it gives an X-ray diffraction pattern of a distinctly oriented crystalline structure. The various characteristics of such rubber hydrochloride film material have been fully described in the article "An X-ray Study of Rubber Hydrochloride" by Gehman, Field and Dinsmore in the India Rubber World, volume 98, No. 3, page 39.

Fig. 4 is a greatly enlarged cross-sectional view of a five-ply laminated ribbon product of the invention. A microscopic examination of such cross section shows that there is a definite boundary line between adjacent plies making up such laminated product, and the boundary line appears to be caused by the fact that the region of the junction between adjacent lamination plies has a different refractive index than the body of the plies.

Fig. 5 is a cross-sectional view similar to Fig. 4 of a laminated thread product of the invention. A narrow segmental region of this cross section has the same boundary line between adjacent overlapping film formations as the cross section of Fig. 4.

The same is also the case for the laminated covering of a core, such as wire strands 51 shown in Fig. 6, enclosed by a laminated, cover in the manner described above, Fig. 7 showing a view of such covered product.

Since my original discoveries described above in connection with rubber hydrochloride material, there has been developed and made commercially available several types of films made from polyvinyl derivatives, polystyrol derivatives, etc., which exhibit definite thermoelastic characteristics similar to those possessed by rubber hydrochloride, namely, of becoming coalescent and elastic when heated above normal temperature, and which have been found suitable for making improved desirable laminated products by the process of the present invention described above.

The novel features of the invention relating to covered products described above to illustrate exemplifications of the present invention are not claimed herein, but in my copending application, Serial No. 467,357, filed November 30, 1942, as a continuation-in-part of the present application and various other applications referred to hereinabove.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In the production of a laminated product, the process comprising heating an elongated film-like formation of rubber hydrochloride material, and stretching, overlapping and uniting adjacent overlapped portions of said film-like formation into a thread-like product while heated, and cooling the product while maintained in the stretched condition.

2. In the production of a laminated product, the process comprising heating an elongated film-like formation of rubber hydrochloride material, and stretching, overlapping and rolling adjacent overlapped portions of said film-like formation so as to unite said adjacent overlapped portions into a thread-like product while heated, and cooling the product while maintained in the stretched condition.

3. In the production of a laminated product, the process including heating a plurality of film-like formations of rubber hydrochloride material, and stretching and uniting the formations into a laminated product while heated, and cooling the product while maintained in stretched condition.

4. The method of forming a laminated product comprising heating a plurality of film-like formations of rubber hydrochloride, and stretching and uniting the formations into a laminated product while heated, cooling the product while maintained in the stretched condition and carrying the process out continuously so that as one portion of a formation is being heated another portion of the same formation is being cooled as a constituent part of the laminated product.

5. The process of producing a laminated rubber hydrochloride product which includes heating films composed essentially of rubber hydrochloride, and then stretching the films and uniting them by pressure while hot, and cooling the united films while they are maintained in the stretched condition.

6. In the production of a laminated product from a plurality of film-like formations composed essentially of rubber hydrochloride that is solid under normal conditions, the process including heating the film formations to a raised temperature at which their structure becomes coalescent, then stretching and coalescing the formations under pressure while hot, and then cooling the resulting product, while maintaining it in the stretched condition, to a temperature at which it retains its stretched coalesced structure.

7. In the production of a laminated product from a plurality of film-like formations composed essentially of rubber hydrochloride that is solid and has relatively small tensile strength under normal conditions, the process including heating the film formations to a raised temperature, then stretching and coalescing the formations while hot, and then cooling the resulting product, while maintaining it in the stretched condition, to a temperature at which it retains its stretched coalesced condition and exhibits materially greater tensile strength in the direction of the stretching action.

8. In the production of a laminated product from a plurality of film-like formations composed essentially of rubber hydrochloride that is solid and has relatively small tensile strength under normal conditions, the process including heating the film formations to a raised temperature, stretching the heated formations to increase at least one dimension of said formations to at least about three times the normal dimension, and coalescing the heated film-like formations and then cooling the resulting product while maintaining it in the stretched condition to a temperature at which it retains its stretched coalesced condition and exhibits materially greater tensile strength in the direction of the stretching action.

9. In the production of a laminated product from a plurality of film-like formations composed essentially of rubber hydrochloride that is solid and has relatively small tensile strength under normal conditions, the process including heating the film formations to a raised temperature, stretching the heated formations to increase the areas of said formations to at least about two times the normal area, and coalescing the heated film-like formations, and then cooling the resulting product while maintaining it in the stretched condition to a temperature at which it retains its stretched coalesced condition and exhibits materially greater tensile strength in the direction of the stretching action.

10. In the production of a laminated product from a plurality of film-like formations composed essentially of rubber hydrochloride that is solid under normal conditions, the process including heating the film formations to a raised temperature at which their structure becomes coalescent, stretching at least one film-like formation while hot till at least one of its dimensions is materially increased and coalescing the stretched formation to another film formation while said formations are hot and then cooling the coalesced product to a lower temperature while maintaining it in the stretched condition.

11. A laminated product comprising a plurality of coalesced film formations composed essentially of thermo-elastic material, such as rubber hydrochloride, which has a crystalline structure and is coalescible and exhibits elastic properties within a predetermined raised temperature range; which film formations have been stretched and coalesced under pressure at a raised temperature within said range and then set in the stretched coalesced condition in which the coalesced film formations give an X-ray diffraction pattern of an oriented crystalline structure.

12. A laminated product comprising a plurality of coalesced film formations composed essentially of rubber hydrochloride which have been stretched and coalesced under pressure while at a sufficiently high temperature to increase at least one dimension of said formations to at least about three times the normal dimension and set in the stretched coalesced condition in which it exhibits in at least one direction materially greater tensile strength than similar normal rubber hydrochloride which has not been stretched.

13. A laminated product comprising a plurality of coalesced film formations composed essentially of rubber hydrochloride which have been stretched and coalesced under pressure at a raised temperature at which the formations are coalesced and elastic and set in the stretched coalesced condition in which it has an X-ray diffraction pattern of an oriented crystalline structure.

14. In the production of a slender elongated object, such as a thread or cord, the process comprising heating elongated film-like formations of rubber hydrochloride material and winding said formations in spirally overlapped relation over a slender elongated core while stretching, overlapping and uniting the adjacent overlapped portions of said formations in the heated state and setting the wrapped formations in the stretched united state.

15. In the production of a laminated product from a plurality of film-like formations composed essentially of thermo-elastic material, such as rubber hydrochloride, which is substantially solid under normal conditions and becomes elastic when heated to a temperature at which it is coalescent, the process including heating the film-like formations of the thermo-elastic material to a raised temperature at which they become coalescent and elastic, and stretching, overlapping and uniting the formations under pressure while hot into a laminated structure, and then setting the resulting product by cooling it in the stretched condition to a temperature at which it retains its stretched united laminated structure.

16. In the production of a laminated product, such as a thread or a cord, from an elongated film-like formation composed essentially of thermo-elastic material, such as rubber hydrochloride, which is substantially solid under normal conditions and becomes elastic when heated to a temperature at which it is coalescent, the process including heating the film-like formation of the thermo-elastic material to a raised temperature at which it becomes coalescent and elastic, and overlapping, stretching and uniting adjacent overlapped portions of the heated formation under pressure while hot into a laminated structure, and then setting the resulting product by cooling it in the stretched condition to a temperature at which it retains its stretched united laminated structure.

17. In the production of a laminated product from a plurality of film-like formations composed essentially of thermo-elastic material, such as rubber hydrochloride, which is substantially solid under normal conditions and becomes elastic when heated to a temperature at which it is coalescent, the process including heating the film-like formations of the thermo-elastic material to a raised temperature at which they become coalescent and elastic, and stretching, overlapping and uniting the formations under pressure while hot into a laminated structure, and then setting the resulting product by cooling it in the stretched condition to a temperature at which it retains its stretched united laminated structure, and carrying on the above process continuously so that as some portions of the formations are being heated, stretched and united other portions of the formations are being cooled as a constituent part of the laminated product.

18. In the production of a laminated product, such as a thread or a cord, from an elongated film-like formation composed essentially of thermo-elastic material, such as rubber hydrochloride, which is substantially solid under normal conditions and becomes elastic when heated to a temperature at which it is coalescent, the process including heating the film-like formation of the thermo-elastic material to a raised temperature at which it becomes coalescent and elastic, and stretching, overlapping and uniting adjacent overlapped portions of the heated formation under pressure while hot into a laminated structure, and then setting the resulting product by cooling it in the stretched condition to a temperature at which it retains its stretched united laminated structure, and carrying on the above process continuously so that as some portions of the formation are being heated, stretched and united other portions of the formation are being cooled as a constituent part of the laminated product.

19. In the production of a slender elongated product, such as a filament or cord, the process comprising heating an elongated filmlike formation of rubber hydrochloride material, and stretching, overlapping, uniting and compacting adjacent overlapped portions of said filmlike formation into a slender elongated product while heated, and cooling the slender elongated product while maintaining said product stretched.

20. A slender elongated product, such as a filament or a cord, comprising an elongated film formation composed essentially of rubber hydrochloride, the adjacent elements of which have been overlapped, stretched, united and compacted while heated and subsequently set in the united compacted condition.

HENRY D. MINICH.